Sept. 11, 1923.

B. W. MACY

OIL PUMP

Filed Jan. 21, 1922

1,467,441

2 Sheets-Sheet 1

INVENTOR
B. W. MACY,

BY
ATTORNEY

Sept. 11, 1923.

B. W. MACY 1,467,441

OIL PUMP

Filed Jan. 21, 1922

2 Sheets-Sheet 2

INVENTOR
B. W. MACY,
BY
ATTORNEY

Patented Sept. 11, 1923.

1,467,441

UNITED STATES PATENT OFFICE.

BARNETT WRIGHT MACY, OF JACKSONVILLE, FLORIDA, ASSIGNOR TO ELECTRIC HEATING CORPORATION, OF JACKSONVILLE, FLORIDA, A CORPORATION OF FLORIDA.

OIL PUMP.

Application filed January 21, 1922. Serial No. 530,901.

*To all whom it may concern:*

Be it known that I, BARNETT WRIGHT MACY, a citizen of the United States, residing at Jacksonville, in the county of Duval and State of Florida, have invented certain new and useful Improvements in Oil Pumps, of which the following is a specification.

Figure 1:
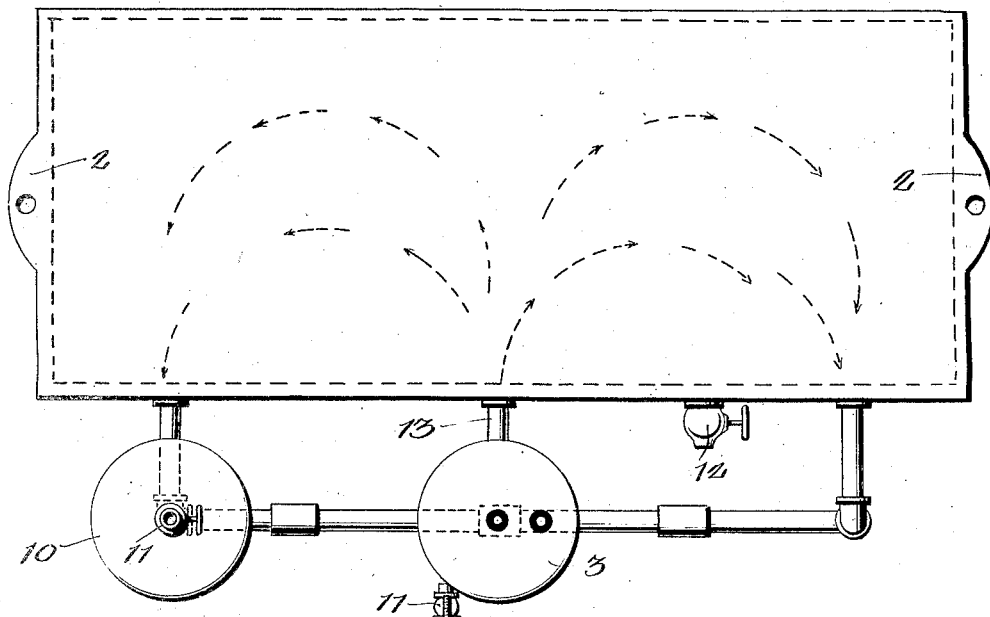
Figure 2:
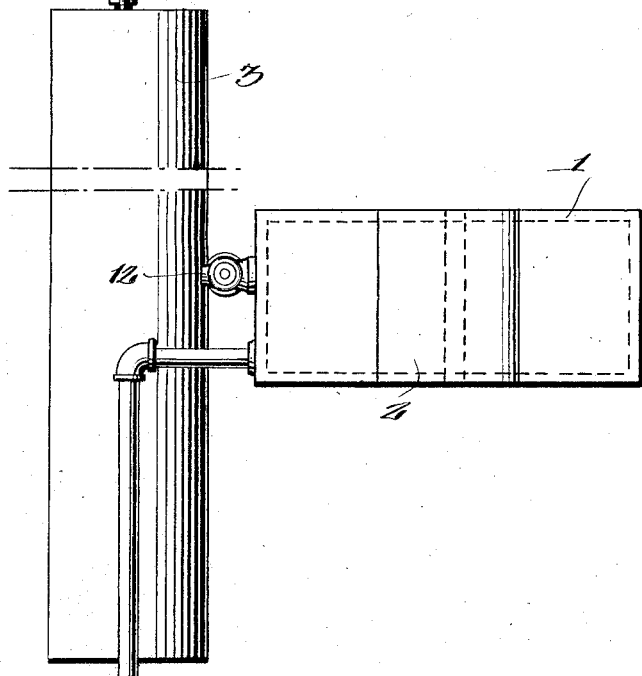
Figure 3:
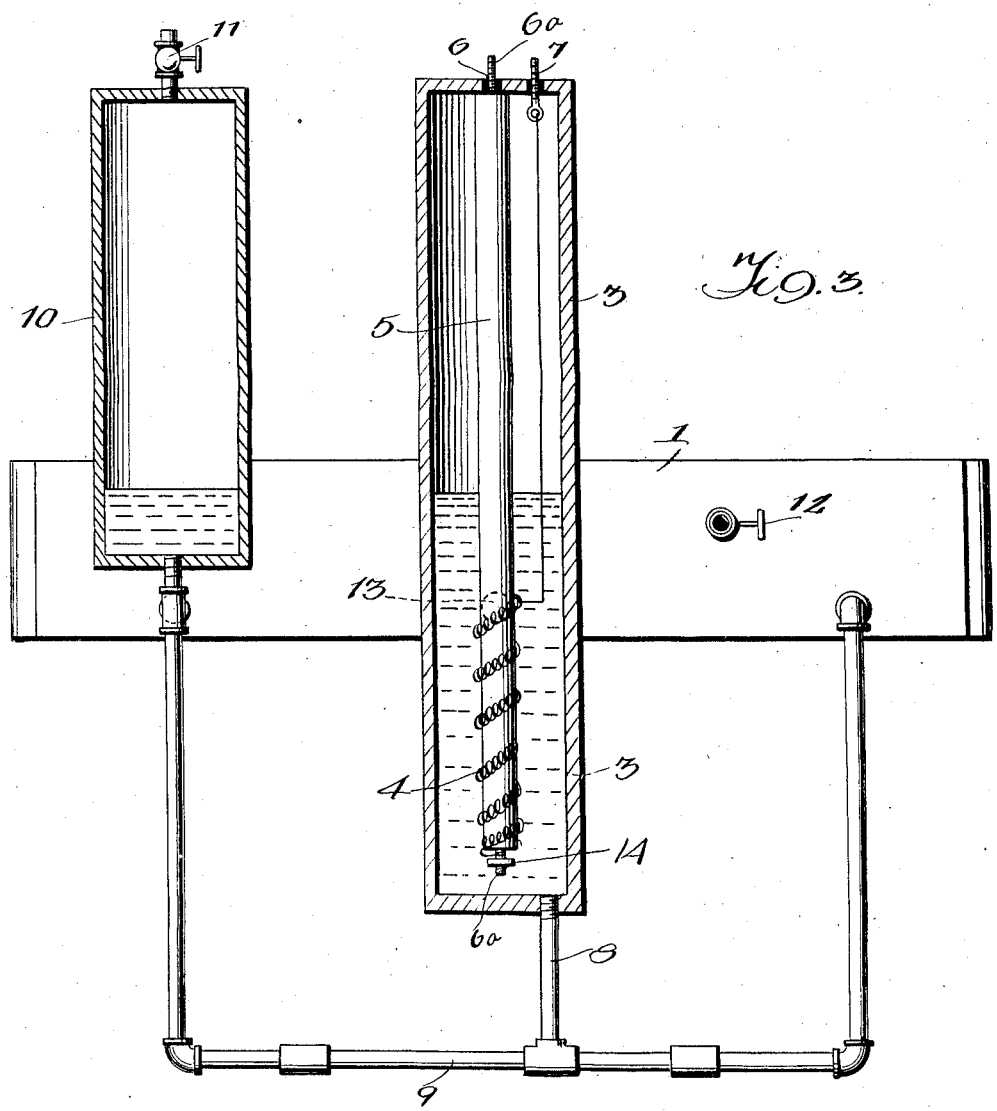
Figure 4:
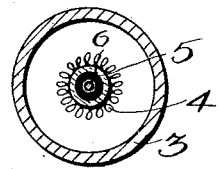

This invention relates to electric heating systems in which the heat is communicated to the object to be heated by a fluid medium. The object of the invention, in general, is to produce a system of this character which is of simple and comparatively cheap construction and which will operate at high efficiency. The particular object of the invention is to produce a system in which the heat is generated in a separate tank and communicated to the object to be heated by means of a fluid medium circulating in a system of conduits therebetween, the circulation being automatically created by connection currents and by positive pumping of the fluid from the heating tank to the object to be heated produced by a relatively high-pressure air cushion in the heating tank. These and other objects of the invention will be clear from the following description taken in connection with the accompanying drawings, in which, Figure 1 is a top plan view of the system, Figure 2 is a side elevation thereof, Figure 3 is an elevation looking at right angles to Figure 2 and showing the heating and relief tanks in section, and Figure 4 is a cross section of the heating tank.

The system comprises a receptacle 1, composed preferably of a single casting having apertured end lugs 2 by means of which it may be secured to a suitable support. The receptacle, as illustrated, has flat rectangular faces, but this particular form of the receptacle is of course not an essential feature of the invention. The form illustrated indicates the adaptation of the invention to laundry use, the receptacle having a flat smooth top suitable for ironing purposes. This form of the receptacle could also be used for cooking purposes, as for example, for frying griddle cakes, and the principle can be applied by variously modified apparatus so as to be useful in any of the arts where a heating device is necessary or desirable.

The heat is generated by the transformation of electricity into heat in a tank 3, this being effected by the use of a resistance coil 4 wound on a support 5 here shown as consisting of a porcelain tube which is located axially of the tank. For this purpose the tank has at its upper end an axially located bushing 6 of insulating material. The bushing may have threads or may contain a nut embedded therein. If preferred a nut may be located above the bushing, the nut being then smaller than the bushing to insure insulation. A threaded core rod 6$^a$ in the tube is supported by the bushing or nut and the lower end of said core rod projects from the tube and carries a head or a nut 14 by which the tube is supported. One terminal of the resistance coil is connected to said projecting end of the core rod, the other terminal thereof being connected to a screw 7 supported by an insulating bushing in the upper head of the tank.

A vertical pipe is connected to the bottom of tank 3 and is connected by a T-joint with a horizontal pipe 9, which, as clearly shown, is connected by vertical and horizontal pipes and near the bottom thereof. A relief tank 10 has its bottom in communication with the system of pipes referred to, as clearly shown in Figure 3. The system is filled with liquid, preferably oil having a high flashing point, to the level indicated in Figure 3. 11 is a relief cock for relieving air pressure in tank 10, and 12 is a cock to relieve pressure in receptacle 1 when the system is being filled with oil. As shown in Figures 1 and 3, there is a pipe connection 13 between the tank 3 and the receptacle 1 substantially midway of the two end pipe connections and substantially in the same horizontal plane therewith.

The operation of the system will be readily understood, but may be briefly described as follows; The head generated by the flow of electric current in resistance coil 4 rapidly heats the oil in tank 3 which produces convection currents flowing through pipe 13 into the bottom of receptacle 1, colder oil flowing down from the receptacle through the pipe connections 9 and 8 into the bottom of the tank to be in turn heated and circulated. Owing to the relatively high temperature of the oil in heating tank 3, the air in the upper part thereof is heated and expanded thereby producing a relatively high pressure in said heating tank. This high pressure air cushion above the surface of the oil in said tank forces out the oil through connection 13 by a positive pumping action, thus materially augmenting the circulation. The pressure of the system may be controlled by operating cock 11.

It will be obvious to those skilled in the art that the device above described may be modified in various ways without departing from the spirit of the invention, the true scope of which is indicated in the appended claims.

Having thus fully described my said invention, what I claim as new and desire to secure by Letters Patent, is:

1. An electric heating system, comprising a flat-topped hollow casting adapted to be supported with its upper surface in horizontal position, a vertically arranged cylindrical heat generating tank extending a substantial distance above and below said casting and having an axially located insulating bushing in the upper end thereof, a porcelain tube having a metallic core rod screwed into said bushing, said core rod projecting from the lower end of said tube, an insulated terminal screw in the upper end of said tank, a resistance coil wound on the lower end of said tube having its upper terminal connected to said terminal screw and having its lower terminal connected to the lower end of said core rod, a vertically arranged relief tank, extending a substantial distance above said casting, pipes connecting the bottoms of said tanks and connecting the same with the interior of said casting at points adjacent the ends and near the bottom thereof and a pipe connecting the side of said heat generating tank with the interior of said casting between said points, the system being adapted to be filled with oil to a level affording substantial air spaces in the upper parts of said tanks.

2. An electric heating system, comprising a hollow closed receptacle, an elongated vertically arranged heat generating tank extending a substantial distance above and below said receptacle, a porcelain tube supported axially in said tank, a resistance coil wound on said tube, insulated screws projecting through the walls of said tank and connected with the terminals of said coil, a relief tank extending a substantial distance above said casting, pipes connecting the bottoms of said tanks and connecting the same with the interior of said receptacle at points adjacent the ends and near the bottom thereof, and a pipe connecting the side of said heat generating tank with the interior of said receptacle between said points, the system being adapted to be filled with liquid to a level affording substantial air spaces in the upper parts of said tanks.

3. An electric heating system, comprising a closed receptacle, an elongated heat generating tank extending a substantial distance above and below said receptacle, an insulating rod extending lengthwise of said tank, a resistance coil wound on said rod, insulated terminals projecting through the walls of said tank and connected to the ends of said coil, a relief tank extending a substantial distance above said receptacle, conduits between the bottoms of said tanks and the ends of said receptacle adjacent the bottom thereof, and a conduit between the side of said heat generating tank and said receptacle. the system being adapted to be filled with liquid to a level affording a substantial air space in said tanks.

4. An electric heating system, comprising a closed receptacle, a heat generating tank, a resistance coil supported in said tank, insulated terminals projecting through the walls of said tank and connected to the ends of said coil, a relief tank, conduits between the bottoms of said tanks and the ends of said receptacle adjacent the bottom thereof, and a conduit between the side of said heat generating tank and said receptacle, the system being adapted to be filled with liquid to a level affording substantial air spaces in said tanks, substantially as set forth.

5. In an electric heating system, a hollow elongated closed receptacle adapted to be horizontally supported, a vertically arranged elongated heat generating tank extending a substantial distance above and below said receptacle and having an axially located insulating bushing in the upper end thereof, a porcelain tube having a metallic core rod screwed into said bushing, said core rod projecting from the lower end of said tube, an insulated screw projecting through the upper end of said tank, a resistance coil wound on the lower end of said tube having its upper terminal connected to said screw and having its lower terminal connected to the lower end of said core rod, pipe connections between the bottom of said tank and the ends of said receptacle adjacent the bottom thereof and a pipe connection between the side of said tank and said casting substantially midway between said end connections, substantially as set forth.

6. In an electric heating system, a closed receptacle adapted to contain a liquid, a heat generating tank extending a substantial distance above and below said receptacle and having an air space above the level of said liquid, an insulating rod supported axially in said tank, a resistance coil wound on said rod, insulated terminals projecting through the walls of said tank and connected to the ends of said coil, pipe connections between the bottom of said tank and the side of said receptacle adjacent the ends and bottom thereof, and a pipe connection between the side of said tank and said casting intermediate said end connections, substantially as set forth.

7. In an electric heating system, a closed receptacle, a heat generating tank, a resistance coil supported in said tank, insulated terminals projecting through the wall of said tank and connected to the ends of said coil, a conduit connecting the lower end of said tank with said receptacle, and a conduit connecting said receptacle with said tank at an intermediate point thereof, the system being adapted to be filled with liquid to a level affording a substantial air space in said tank, substantially as set forth.

8. An electric heating system, comprising a closed receptacle, a heat generating tank, a resistance coil supported in said tank, insulated terminals projecting through the wall of said tank and connected with said coil, a relief tank, pipe connections between the bottoms of said tanks and said receptacle, and a pipe connecting said receptacle with said heat generating tank at an intermediate point thereof, said system being adapted to be filled with liquid to a level affording substantial air spaces in said tanks, substantially as set forth.

9. A heating system comprising a receptacle, a relief cock in said receptacle, a closed tank communicating with the receptacle, a body of liquid in the tank and the receptacle, an air-space above the liquid in the tank, and electrical means for heating the contents of the tank, substantially as set forth.

10. In a laundry appliance, a hollow elongated closed receptacle having flat rectangular faces, and adapted to be horizontally supported by means of apertured end lugs, said lugs being integral with said receptacle, a tank connected thereto, and an electric heating coil in the tank, substantially as set forth.

In witness whereof, I have hereunto set my hand and seal at Jacksonville, Florida this tenth day of November, A. D. nineteen hundred and twenty-one.

BARNETT WRIGHT MACY. [L. S.]

Witnesses:
W. P. HOWARD, Jr.,
ESTHER GATLIN.